United States Patent
Jansen (10) Patent No.: US 9,199,516 B2
(45) Date of Patent: Dec. 1, 2015

(54) INDUCTIVE POWER TRANSFER FOR WIRELESS SENSOR SYSTEMS INSIDE A TIRE

(75) Inventor: Gerardus Lucien Mathildus Jansen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 458 days.

(21) Appl. No.: 13/319,443

(22) PCT Filed: May 5, 2010

(86) PCT No.: PCT/IB2010/051963
§ 371 (c)(1),
(2), (4) Date: Nov. 8, 2011

(87) PCT Pub. No.: WO2010/131161
PCT Pub. Date: Nov. 18, 2010

(65) Prior Publication Data
US 2012/0049620 A1    Mar. 1, 2012

(30) Foreign Application Priority Data

May 11, 2009  (EP) ................................... 09159920
Aug. 20, 2009 (EP) ................................... 09168230

(51) Int. Cl.
B60L 1/00        (2006.01)
H01F 38/14       (2006.01)
B60C 23/02       (2006.01)
B60C 23/04       (2006.01)
H04B 5/00        (2006.01)
H02J 5/00        (2006.01)

(52) U.S. Cl.
CPC ........... *B60C 23/041* (2013.01); *B60C 23/0413* (2013.01); *H02J 5/005* (2013.01); *H04B 5/0037* (2013.01); *H04B 5/0043* (2013.01); *H04B 5/0093* (2013.01); *B60C 23/0433* (2013.01); *B60C 23/0452* (2013.01)

(58) Field of Classification Search
USPC ......................................................... 307/104
See application file for complete search history.

(56) References Cited

U.S. PATENT DOCUMENTS

| | | | | |
|---|---|---|---|---|
| 4,114,151 A * | 9/1978 | Denne et al. | ..................... | 342/44 |
| 4,911,217 A * | 3/1990 | Dunn et al. | ................. | 152/152.1 |
| 4,912,471 A * | 3/1990 | Tyburski et al. | ........... | 340/10.34 |
| 5,218,861 A * | 6/1993 | Brown et al. | ................. | 73/146.5 |
| 5,541,574 A * | 7/1996 | Lowe et al. | ................... | 340/447 |
| 5,731,754 A * | 3/1998 | Lee et al. | ....................... | 340/447 |
| 5,749,984 A * | 5/1998 | Frey et al. | ....................... | 152/415 |
| 6,581,449 B1 * | 6/2003 | Brown et al. | ................... | 73/146 |
| 6,591,671 B2 * | 7/2003 | Brown | ......................... | 73/146.5 |
| 6,791,457 B2 * | 9/2004 | Shimura | ....................... | 340/448 |

(Continued)

FOREIGN PATENT DOCUMENTS

DE   102005016961 A1   4/2005
DE   102005049924 A1   7/2006

(Continued)

*Primary Examiner* — Rexford Barnie
*Assistant Examiner* — Elim Ortiz (57) ABSTRACT

A system for inductive power transfer comprises: a send coil for transmitting power, a receive coil for receiving the power by induction, wherein the receive coil is moveable with respect to the send coil. The system further comprises a communication path from the receive coil to the send coil for only turning on the send coil in case that the receive coil is in close proximity.

6 Claims, 8 Drawing Sheets

(56) References Cited

U.S. PATENT DOCUMENTS

| | | |
|---|---|---|
| 6,868,358 B2 * | 3/2005 | Brown, Jr. ............... 702/138 |
| 6,914,523 B2 * | 7/2005 | Munch et al. ............ 340/447 |
| 7,021,132 B2 * | 4/2006 | Nigon et al. ............ 73/146.5 |
| 7,467,034 B2 | 12/2008 | Breed et al. |
| 2002/0088517 A1 | 7/2002 | Shimura |
| 2002/0190853 A1 * | 12/2002 | Nigon et al. ............ 340/448 |
| 2006/0187049 A1 | 8/2006 | Moser et al. |
| 2007/0119636 A1 | 5/2007 | Varpula et al. |
| 2007/0182533 A1 | 8/2007 | Tanaka |
| 2007/0222570 A1 | 9/2007 | Ou et al. |
| 2008/0047363 A1 | 2/2008 | Arms et al. |
| 2009/0003252 A1 | 1/2009 | Salomone et al. |
| 2010/0164295 A1 * | 7/2010 | Ichikawa et al. ......... 307/104 |
| 2011/0241440 A1 * | 10/2011 | Sakoda et al. ............ 307/104 |
| 2012/0286728 A1 * | 11/2012 | Bella et al. .............. 320/108 |
| 2013/0119930 A1 * | 5/2013 | Sakoda et al. ............ 320/108 |

FOREIGN PATENT DOCUMENTS

| | | | |
|---|---|---|---|
| DE | 102005016961 A1 * | 10/2006 | |
| EP | 0695652 A1 | 2/1996 | |
| EP | 1454769 A1 | 9/2004 | |
| EP | 1870261 A1 | 12/2007 | |
| FR | 2817509 A1 * | 6/2002 | |
| JP | 2002209343 A | 7/2002 | |
| JP | 2006192948 A | 7/2006 | |
| WO | 2009024673 A1 | 2/2009 | |

* cited by examiner

INDUCTIVE POWER TRANSFER FOR WIRELESS SENSOR SYSTEMS INSIDE A TIRE

BACKGROUND OF THE INVENTION

Already known are scavenger systems, which generate energy due to the rotation and vibration of the tyre. In these systems the tyre vibration accelerates a mass in combination with a spring. The moving mass can for instance be a magnet inside a coil, which generates a voltage due to the magnet movement. Another way is to apply piezo-type (PZT) material in the spring, which generates a voltage when stressed (See U.S. Pat. No. 7,467,034 B2 and US 2008/0047363 A1). Also a possibility is a system, which uses a stationary magnet in combination with a coil in the tyre. These systems will not generate sufficient power at low rotation speeds and are possibly rather bulky.

SUMMARY OF THE INVENTION

The proposed system can generate sufficient power at lower rotation speeds. Also it can be very small and be placed in remote locations.

DETAILED DESCRIPTION OF THE EMBODIMENTS

The invention describes a system where a sensor system inside a tyre needs to be provided with electrical power. The sensors measure for instance acceleration, temperature, pressure and strain. The measured data are transmitted via an RF-link. The power for the system needs to be supplied without any galvanic connections. Poor solutions are scavengers which use the rotation and vibrations in the wheel. A better solution with more constant power is inductive power transfer.

With a special arrangement of coils and a special operating mode a reliable power transfer system can be built, which generates power up very low wheel (tyre) speeds.

Figure 1:
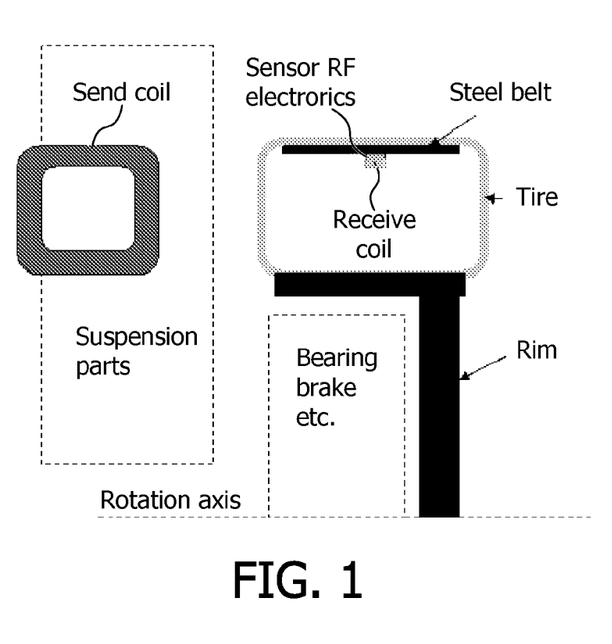
FIG. 1 shows a special send coil construction and orientation

Location send and receiver coil is shown in FIG. 1.

Figure 2:
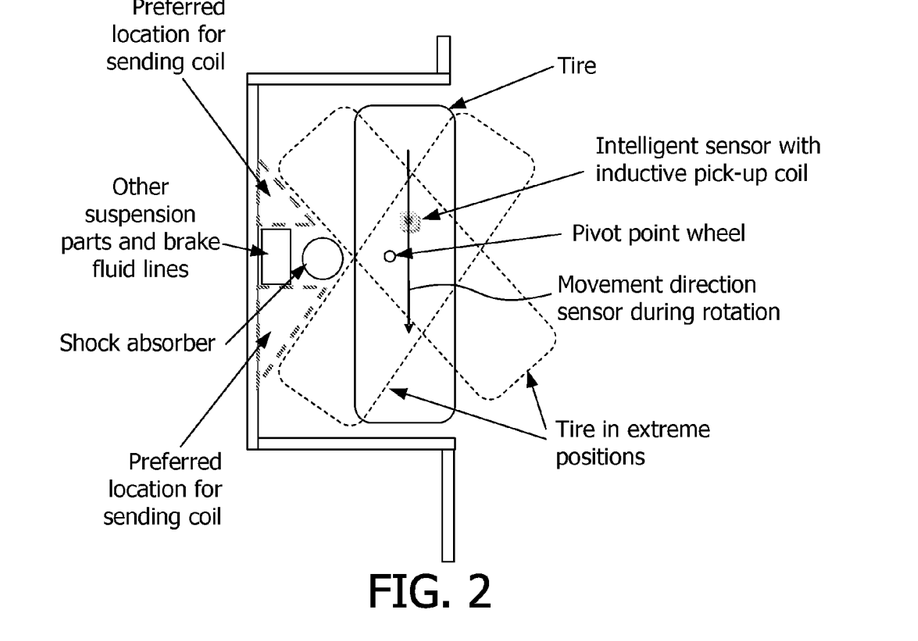

Space limitations in a car system are shown in FIG. 2. The preferred locations for the sending coil are marked.

The essential features of the system are:

Feature 1: Special send coil construction and orientation as shown in the FIG. 1

The send coil is placed perpendicular to the tyre and as close as possible to the tyre. This generates a better field inside the tyre and therefore a better coupling factor to the receive coil in the tyre. When coils are facing each other the flux paths are very long, due to the presence of a steel belt in the tyre and the metallic wheel rim.

Coils are supported with a partial ferrite core. This reinforces the magnetic field generation. It also makes the coil properties less dependent on the environment. Metallic objects in the neighborhood of the coil can influence the inductance of the coil. The ferrite core partly functions as a shield and keeps this inductance more constant.

Feature 2: Special receive coil construction and orientation

Figure 3:
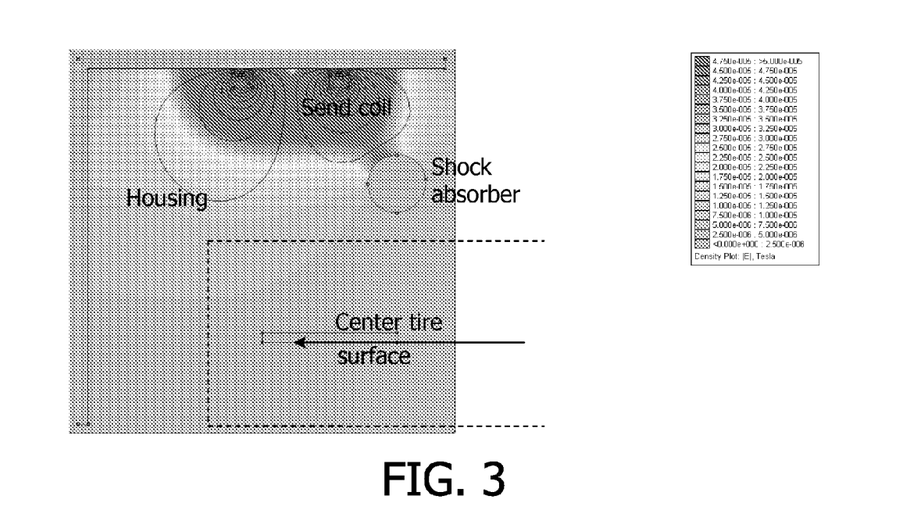
FIGS. 3, 4 and 5 show the field at the center of the tyre is main parallel to the tyre.
Figure 4:
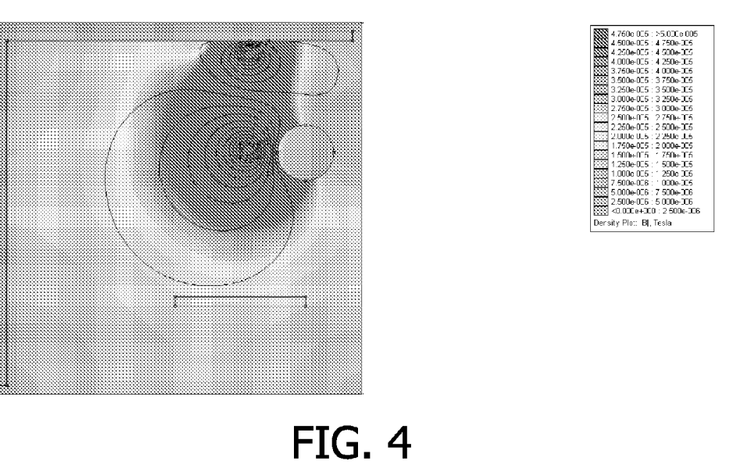

The receive coil is placed perpendicular to the tyre as shown in FIG. 1. The field at the centre of the tyre is main parallel to the tyre as shown in FIGS. 3, 4 and 5.

Figure 5:
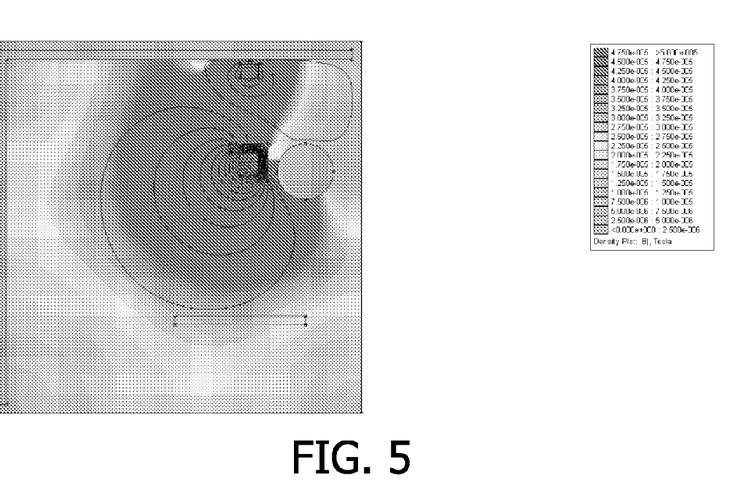

A perpendicular oriented coil will best pick up these flux lines as shown in the FIG. 5. The receive coil is located on the inside of the tyre above the centre of the inner tyre surface. FIG. 3 shows the send coil parallel to tyre, and receive coil in centre tyre. FIG. 4 shows the send coil perpendicular to tyre. FIG. 5 shows the send coil perpendicular to tyre, with ferrite support/shielding.

Feature 3: Special operation mode

Figure 6:
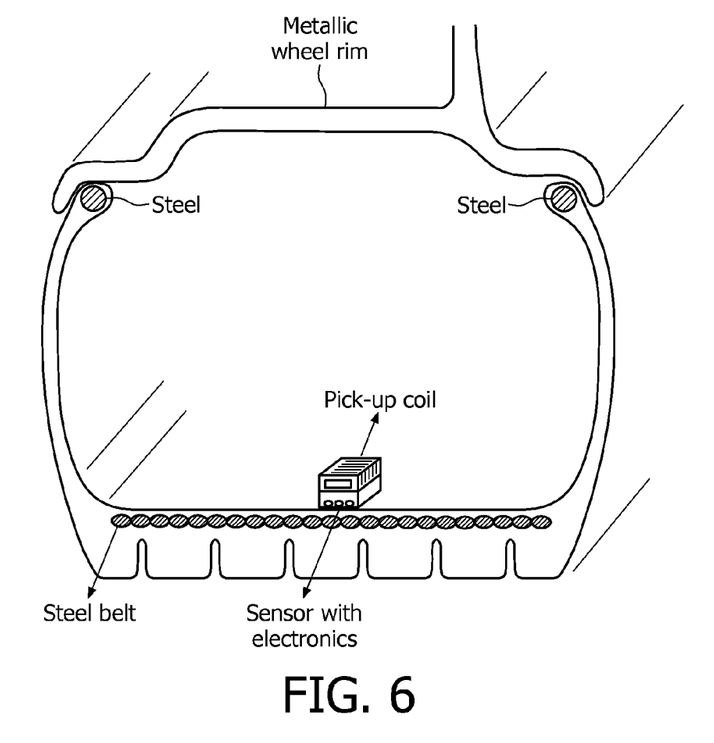
FIG. 6 shows the tyre and the receive (pick-up) coil inside the tyre.

FIG. 6 shows the tyre and the receive (pick-up) coil inside the tyre.

The general state of the art technology in wireless power transfer system can be described as following:

There is a send coil (primary)

There is a receive coil (secondary)

There is a sufficient amount of coupling between the send and receive coil.

The send coil has a driver operating on a certain frequency

In case of a low coupling the driver has an optional resonant circuit

Figure 7:
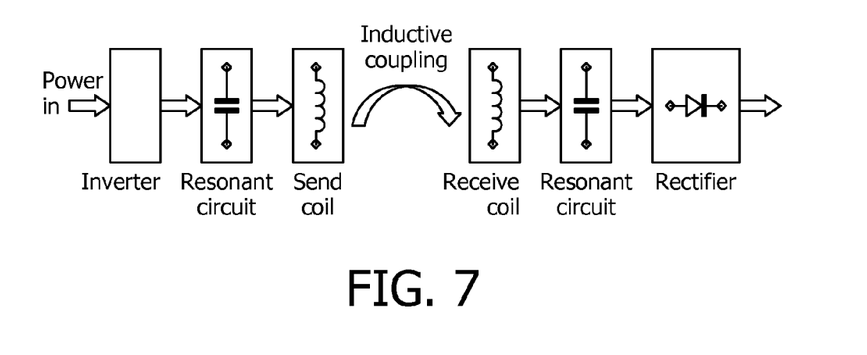
FIG. 7 shows schematically how is the power transferred from the send coil to the receive coil by magnetic induction.

The receive coil has a rectifier-conditioner for generating the proper DC-voltage Also again in the case of low coupling the receive coil has an optional resonant circuit FIG. 7 shows schematically how is the power transferred from the send coil to the receive coil by magnetic induction.

Figure 8:
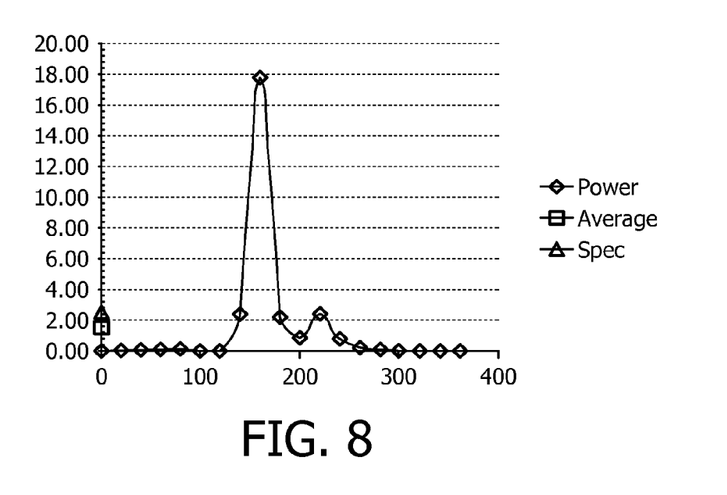
FIG. 8 shows the generated power as function of the arrangement
Figure 9:
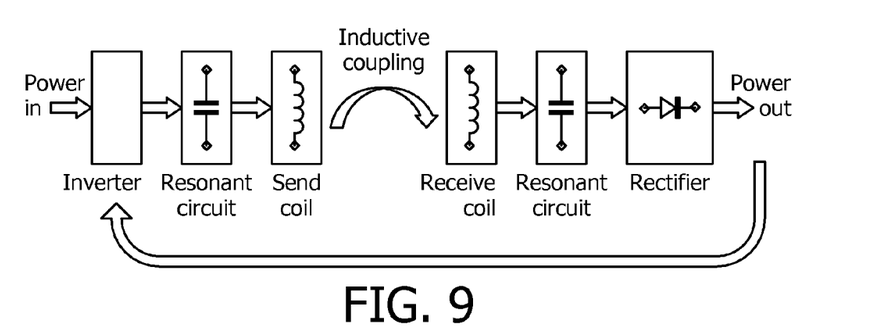
FIG. 9 schematically shows a communication path from the receiver to the sender via a RF-link

FIG. 8 shows the generated power as function of the arrangement. It shows that there is a small angle which generates most of the power. This measurement is based on a continuous power level in the send coil. A better overall efficiency can be achieved by only turning the coil on in case that the receive coil is in close proximity. Required for this is a communication path from the receiver to the sender. It is possible to do this via a RF-link (which is already foreseen for transmitting the sender data). This is schematically shown in FIG. 9.

Figure 10:
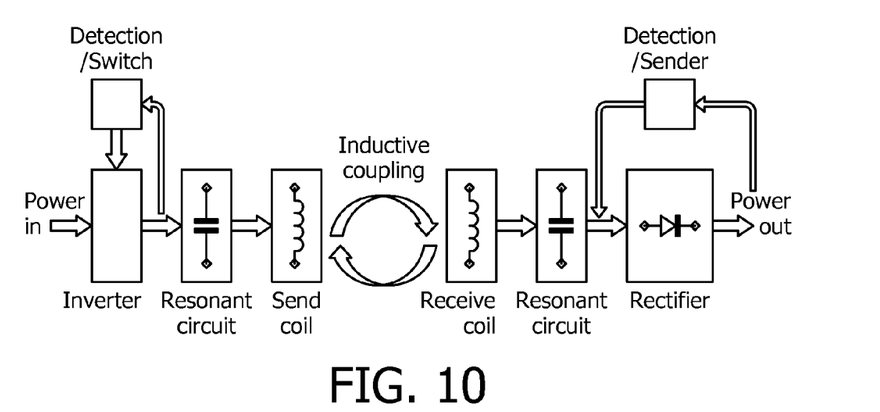
FIG. 10 shows the inductive path using 2 modes, one mode for sending energy and the other mode for a returning signal that power is generated at a sufficient level.

Another way is to use the inductive path in 2 modes, one mode for sending energy and the other mode for a returning signal that power is generated at a sufficient level. This is schematically shown in FIG. 10.

Figure 11:
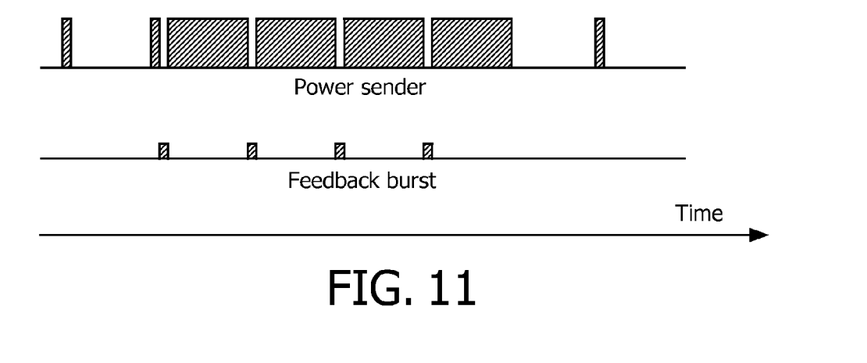
FIG. 11 schematically shows that the full period bursts will stop as soon as no sufficient power receive signal is generated.

The operation mode of the system could look as following. The sender sends a small test burst to investigate if power is received at a certain. In case of feedback of a sufficient power receive signal the next cycle the sender will generate a full period burst. The full period bursts will stop as soon as no sufficient power receive signal is generated. This is schematically shown in FIG. 11.

Figure 12:
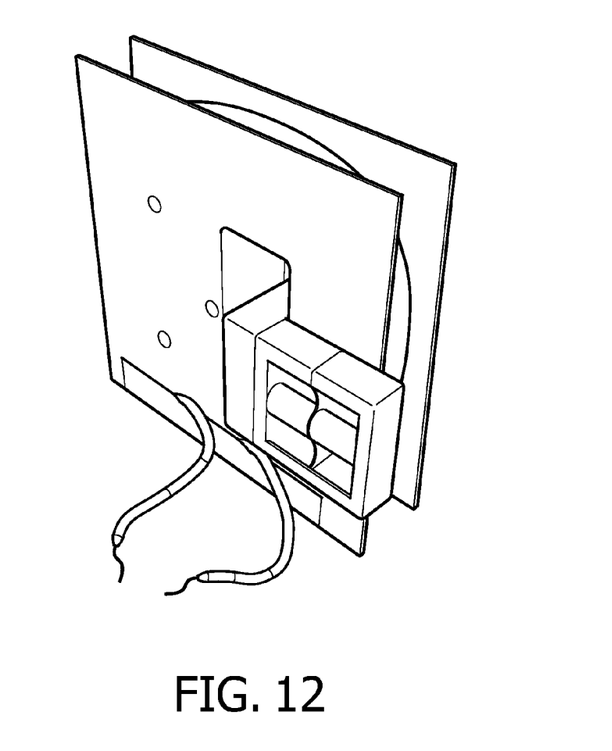
FIG. 12 shows the send coil.

FIG. 12 shows the send coil.

Figure 13:
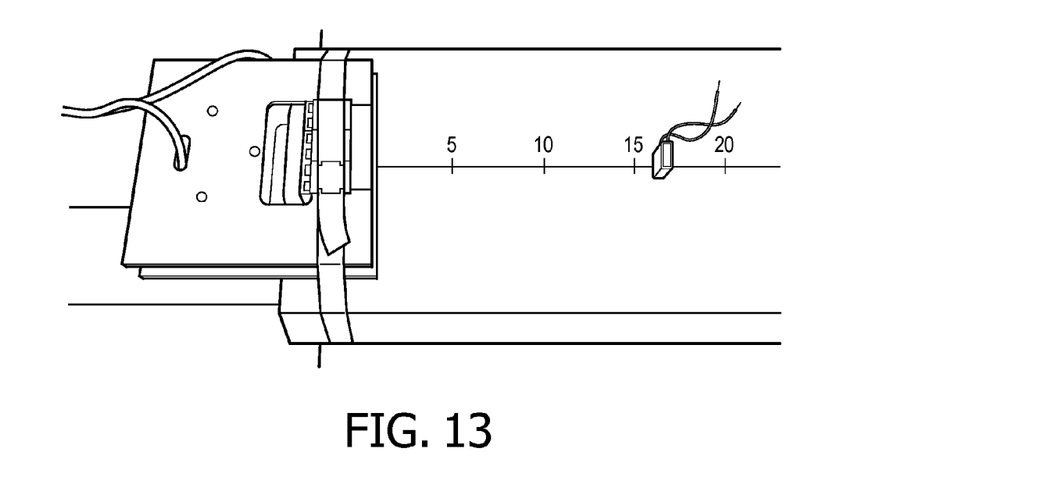
FIG. 13 shows the position of the send coil and the receive coil in the test system.

FIG. 13 shows the position of the send coil and the receive coil in the test system.

Figure 14:
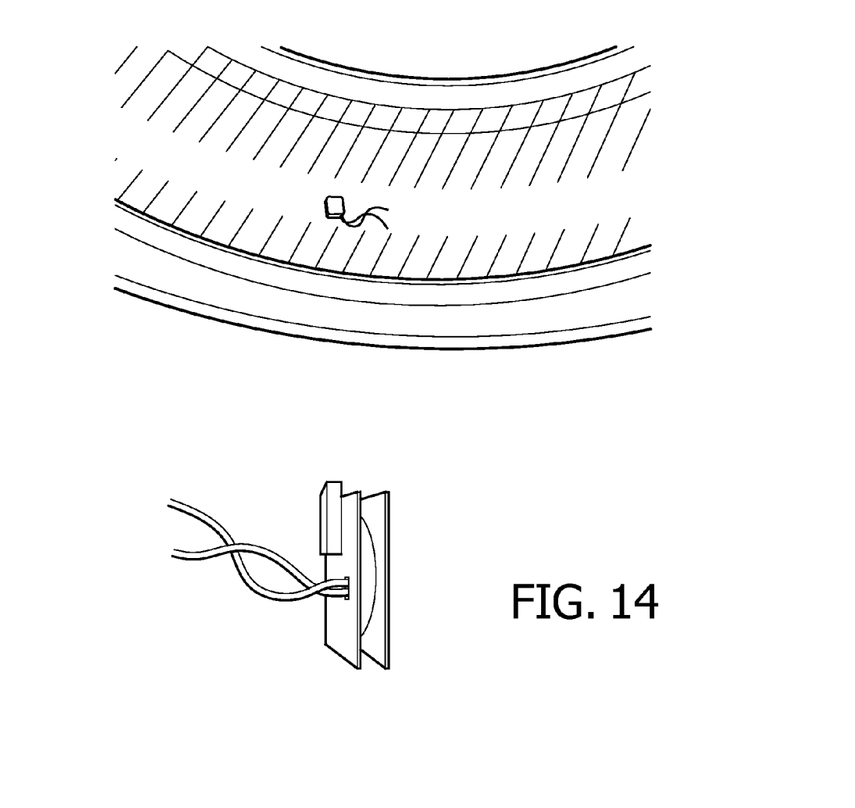
FIG. 14 shows the position of the send coil and the receive coil wherein the receive coil is placed in the tyre.

FIG. 14 shows the position of the send coil and the receive coil wherein the receive coil is placed in the tyre.

Figure 15:
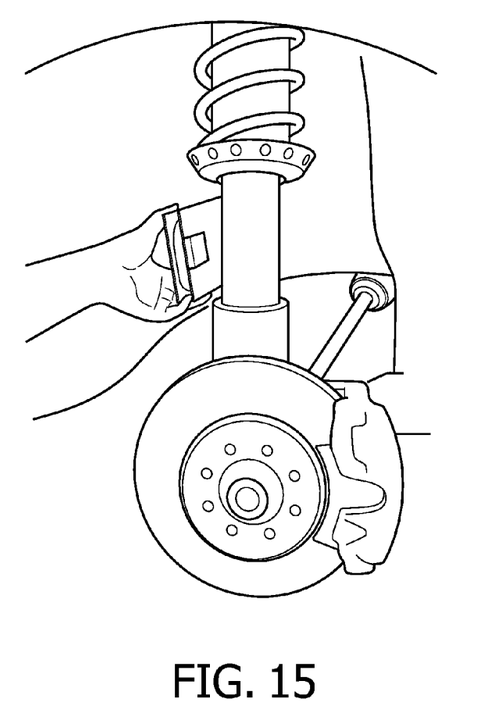
FIG. 15 shows the position of the send coil in respect to a car.

FIG. 15 shows the position of the send coil in respect to a car.

The invention claimed is:

1. A system for inductive power transfer comprising:
a send coil transmitting power,
a receive coil receiving the power by induction, the receive coil being positioned along an inside surface of a tire, wherein the receive coil having a variable position with respect to the send coil, the position varying as the receive coil rotates with respect to the send coil from a minimum distance between the receive coil and the send coil to a maximum distance,
a first communication path formed between the receive coil and the send coil, the first communication path providing a path for transmitting power to the receive coil; and
a second communication path formed between the receive coil and the send coil, the second communication path providing a path for a feedback signal to the send coil,
wherein the send coil determines a measure of the feedback signal and transmits a full burst of power on the first communication path in response to the feedback signal being of sufficient power, the feedback signal being of sufficient power within an angular alignment window about the minimum distance between the receive coil and the send coil.

2. The system according to claim 1, wherein the second communication path comprises anRF-link.

3. The system according to claim 1, wherein a trajectory of the receive coil forms a substantially circular-shape.

4. The system according to claim 1, wherein the send coil is mounting on a vehicle.

5. A vehicle comprising:
at least one tire; and
a system comprising:
a send coil transmitting power,
a receive coil receiving the power by induction, the receive coil being positioned along an inner surface of an outer edge of the at least one tire, the receiving coil having a position varying in a circular manner with respect to the send coil as the at least one tire rotates, the position varying as the receive coil rotates with respect to the send coil from a minimum distance between the receive coil and the send coil to a maximum distance,
a communication path from the receive coil to the send coil, the receive coil providing a feedback signal responsive to a test burst from the send coil, wherein the send coil determines a power of the feedback signal and provides a full burst of transmitting power in response to the feedback signal being of sufficient power, the feedback signal of sufficient power being generated when the receive coil is within an angular alignment window about the minimum distance.

6. A tire comprising:
a sensor providing a physical signal associated with a power; and
a receive coil, positioned on an inner surface of the tire and having a position varying in a circular motion with respect to a source of the physical signal as the at least one tire rotates, the position varying as the receive coil rotates with respect to the send coil from a minimum distance to a maximum distance between the receive coil and the send coil:
receiving the power by induction, and
providing a feedback signal to the source of the physical signal, wherein the sensor determines a power of the feedback signal and provides a full burst of the physical signal to the receive coil when the feedback signal is of sufficient power, the feedback signal being of sufficient power when the receive coil is within a window of angular alignment with the source about the minimum distance between the receive coil and the sensor.

* * * * *